United States Patent
Fanton

(10) Patent No.: US 10,746,530 B2
(45) Date of Patent: Aug. 18, 2020

(54) OPTICAL METROLOGY DEVICE FOR MEASURING SAMPLES HAVING THIN OR THICK FILMS

(71) Applicant: ONTO INNOVATION INC., Wilmington, MA (US)

(72) Inventor: Jeffrey T. Fanton, Los Altos, CA (US)

(73) Assignee: ONTO INNOVATION INC., Wilmington, MA (US)

( * ) Notice: Subject to any disclaimer, the term of this patent is extended or adjusted under 35 U.S.C. 154(b) by 0 days.

(21) Appl. No.: 16/213,507

(22) Filed: Dec. 7, 2018

(65) Prior Publication Data

US 2020/0182606 A1    Jun. 11, 2020

(51) Int. Cl.
   *G01B 11/06* (2006.01)
(52) U.S. Cl.
   CPC .............. *G01B 11/0641* (2013.01)
(58) Field of Classification Search
   CPC ............ G01B 11/0641; G01B 11/06
   USPC ...................................... 356/367
   See application file for complete search history.

(56) References Cited

U.S. PATENT DOCUMENTS

| | | |
|---|---|---|
| 5,936,734 A | 8/1999 | Johs et al. |
| 6,897,955 B2 | 5/2005 | Wielsch et al. |
| 6,909,548 B2 | 6/2005 | Duggan |
| 7,050,162 B2 | 5/2006 | Opsal et al. |
| 7,522,272 B2 | 4/2009 | Wolf et al. |
| 7,554,654 B2 | 6/2009 | Meeks et al. |
| 7,633,625 B1 | 12/2009 | Woollam et al. |
| 2008/0037005 A1* | 2/2008 | Bareket ............... G01N 21/211 356/73 |
| 2009/0066953 A1 | 3/2009 | Horie |

* cited by examiner

*Primary Examiner* — Roy M Punnoose
(74) *Attorney, Agent, or Firm* — Paradice and Li LLP

(57) ABSTRACT

An optical metrology device includes an aperture that can be adjusted based on the thickness of the film on a sample. The aperture is adjusted to have a first aperture configuration or a second aperture configuration, where the second aperture configuration allows more light to pass. The aperture may be adjusted to use the second aperture configuration, e.g., if the thickness of the film produces a lateral shift from each internal reflection in the film at least 80% of the measurement spot size or the film thickness is greater than a predesignated amount, or if the light measured with the first aperture configuration and second aperture configuration differs by more than a predetermined threshold. The aperture may be in the source arm of the optical system, e.g., between the light source and the sample, or the receiver arm of the optical system, e.g., between the sample and the detector.

33 Claims, 11 Drawing Sheets

OPTICAL METROLOGY DEVICE FOR MEASURING SAMPLES HAVING THIN OR THICK FILMS

FIELD OF THE INVENTION

The present invention is related to optical metrology and, in particular, to optical metrology of samples having thin or thick films.

BACKGROUND

Semiconductor and other similar industries, often use optical metrology equipment to provide non-contact evaluation of substrates during processing. With optical metrology, a sample under test may be illuminated with light at a single wavelength or multiple wavelengths, e.g., at an oblique angle. After interacting with the sample, the resulting light is detected and analyzed to determine a desired characteristic of the sample. For example, the measured light from the sample may be compared to predicted light from a model. Desired parameters of the sample are varied in the model until a good fit is achieved between the predicted light and the measured light, at which time the modeled parameters are determined to be the characteristic of the sample.

Samples of interest typically have one or more films stacked on a substrate. In the semiconductor industry, and other similar industries, thin films ranging from a fraction of a nanometer to a few micrometers in thickness are used. The measurement of thin films using optical metrology is well known and considered straight forward. Industries, such as the semiconductor industry, however, are significantly increasing the thickness of films due to vertical stacking, which poses new challenges for conventional optical metrology techniques. For example, internal reflections of light within thick films produce complications that are difficult to overcome using conventional modeling techniques.

SUMMARY

An optical metrology device includes an aperture that can be adjusted based on the thickness of the film on a sample. The aperture is adjusted to have a first aperture configuration or a second aperture configuration, where the second aperture configuration allows more light to pass. The aperture may be adjusted to use the second aperture configuration, e.g., if the thickness of the film produces a lateral shift from each internal reflection in the film at least 80% of the measurement spot size or the film thickness is greater than a predesignated amount, or if the light measured with the first aperture configuration and second aperture configuration differs by more than a predetermined threshold. The aperture may be in the source arm of the optical system, e.g., between the light source and the sample, or the receiver arm of the optical system, e.g., between the sample and the detector.

In one implementation, a method of determining a characteristic of a film on a sample with an optical metrology device includes producing light with a light source; focusing the light to be obliquely incident in a measurement spot on the sample, the measurement spot having a spot size, wherein at least a portion of the light is reflected off the sample; receiving the light reflected from the sample with a detector; adjusting a configuration of an aperture in a beam path of the light to use a first aperture configuration or a second aperture configuration based on a thickness of the film on the sample, wherein the second aperture configuration allows more light to pass in the beam path than the first aperture configuration; and determining the characteristic of the film on the sample with output signals from the detector in response to the light reflected from the sample.

In one implementation, an optical metrology device capable of determining a characteristic of a film on a sample, includes a light source that produces light; a first set of focusing optics that obliquely focuses the light into a measurement spot on the sample, the measurement spot having a spot size, wherein at least a portion of the light is reflected by the sample; a second set of focusing optics that receives the light reflected from the sample; a detector that receives the light from the second set of focusing optics; an adjustable aperture in a beam path of the light, wherein the adjustable aperture is configured to have a first aperture configuration or a second aperture configuration based on a thickness of the film on the sample, wherein the second aperture configuration allows more light to pass in the beam path than the first aperture configuration; and at least one processor coupled to the detector and configured to determine the characteristic of the sample with output signals from the detector in response to the light reflected from the sample.

In one implementation, an optical metrology device capable of determining a characteristic of a film on a sample, includes a light source that produces light; a first set of focusing optics that obliquely focuses the light into a measurement spot on the sample, the measurement spot having a spot size, wherein at least a portion of the light is reflected by the sample; a second set of focusing optics that receives the light reflected from the sample; a detector that receives the light from the second set of focusing optics; a first aperture in a beam path of the light positioned between the light source and the sample; a second aperture in the beam path positioned between the sample and the detector; wherein at least one of the first aperture and the second aperture is adjustable to a different configuration based on a thickness of the film on the sample, wherein in a first configuration sizes of the first aperture and the second aperture match and in a second configuration the sizes of the first aperture and the second aperture do not match and one of the first aperture and the second aperture allows more light to pass in the beam path than the other; and at least one processor coupled to the detector and configured to determine the characteristic of the sample with output signals from the detector in response to the light reflected from the sample.

DETAILED DESCRIPTION

An optical metrology device may be configured to perform measurements of samples having either thin films or thick films by adjusting an aperture in the beam path based on the thickness of the film on the sample. The aperture may be adjusted to have a first aperture configuration if the film is thin and may be adjusted to have a second aperture configuration if the film is thick, where the second aperture configuration allows more light to pass than the first aperture configuration. The aperture may be in the receiver arm of the optical system or the source arm of the optical system. With the use of the adjustable aperture, the optical metrology device may accurately measure both samples with thin films and samples with thick films, while advantageously using the same modeling techniques.

With a conventional optical metrology device, a conflict arises when attempting to accurately measure a small area of a sample, e.g., typically a measurement pad may be 25 or 50 microns across, when a film on the sample is thick, e.g., 10 µm or more. To measure a small area on a sample, optical systems typically use apertures in both the source arm and the receiver arm that respectively limit the area of the sample that is illuminated, i.e., the size of the measurement spot, and the area of the sample that is imaged by the detector. The two apertures are typically matched so that the area illuminated and the area sampled by the detector is approximately the same size and is coincident. The use of two matching apertures in the optical system, one on the source side and one on the detector side, is a common configuration used in optical metrology systems for reducing the impact of tails of the measurement spot. With use of two matching apertures, the measurement spot size can be minimized more efficiently than with a single-aperture system.

As the thickness of films has been increasing in the semiconductor and other industries, the accurate measurement of a small area on these films has become more problematic. With a relatively thick film, the measurement spot from obliquely incident light tends to smear in the direction of beam propagation, which is sometimes referred to herein as lateral beam walking. The lateral beam walking of the incident light effectively increases the area from which the sample returns light. Using an optical system configured for thin films results in the detection of only a portion of the area from which the sample returns light. For example, only light from a discrete area on the sample, which is approximately the same size and coincident with the initial measurement spot, is detected. Light returned from the sample over the increased area, due to lateral beam walking, is excluded from detection. The exclusion of this light results in artifacts in the measured data and inaccuracies when determining a characteristic of the sample.

Figure 1:
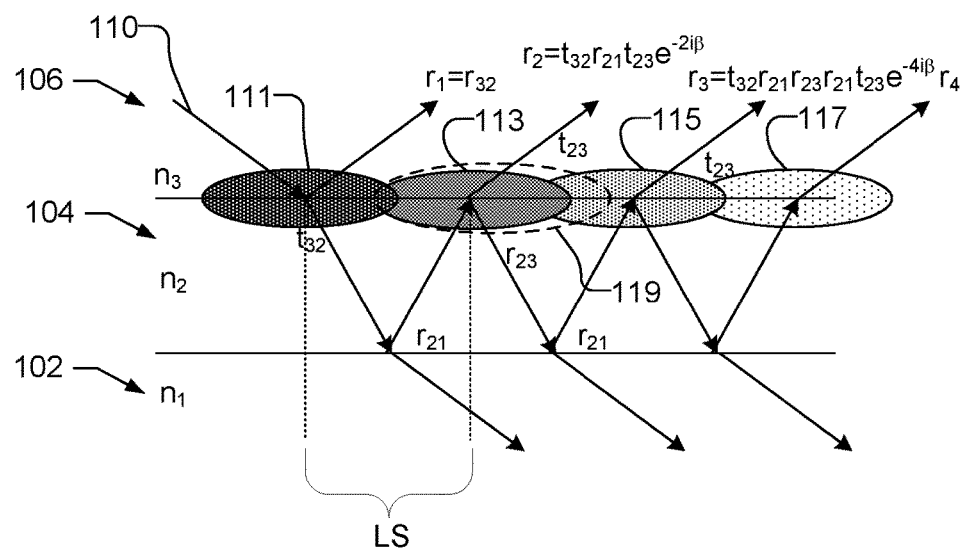
FIG. 1 illustrates a side view of the interaction of obliquely incident light with a thick film on a substrate.

FIG. 1, for example, illustrates a side view of the interaction of obliquely incident light 110 with a thick film 104 on a substrate 102. As illustrated, the substrate 102 has a first refractive index $n_1$, the thick film 104 has a second refractive index $n_2$, and air 106 has a third refractive index $n_3$. The beam of light 110 is illustrated as being obliquely incident on the top surface of the thick film 104 producing a spot 111. As per Fresnel equations, a portion of the light is reflected and another portion is transmitted at each media interface. As illustrated in FIG. 1, a portion of the incident light 110 is transmitted ($t_{32}$) and a portion is reflected ($r_{32}$) at the interface between the air 106 and the film 104. The reflected light ($r_{32}$) is light that is returned from the film 104 ($r_1 = r_{32}$). Within the film 104, multiple internal reflections ($r_{21}$ and $r_{23}$) respectively occur at the interface between the film 104 and the substrate 102 and at the interface between the film 104 and the air 106, and at each interface a portion of the internally reflected light is transmitted.

The multiple internal reflections within the film 104 produces lateral beam walking, e.g., a portion of the incident light propagates within the film 104 so that the light is returned from the film 104 over a significantly greater area than initially incident. For example, at the interface between the film 104 and the air 106, the internally reflected light in film 104 is transmitted ($t_{23}$) into air 106 and thus, is returned from the sample ($r_2$, $r_3$, $r_4$). FIG. 1 illustrates the internal reflection within the film 104 as producing reflections of the initial measurement spot 111 as spots 113, 115, 117 on the surface of the film 104, i.e., at the interface between the film 104 and air 106. The light returned from the surface of the film 104 in response to the incident light may be written as:

$$\vec{r} = \vec{r}_1 + \vec{r}_2 + \vec{r}_3 + \ldots \qquad \text{eq. 1}$$

Moreover, due to the internal reflections and lateral beam walking, each reflection coefficient may be written as:

$$r_1 = r_2$$

$$r_2 = t_{32} r_{21} t_{23} e^{-2i\beta}$$

$$r_3 = t_{32} r_{21} r_{23} r_{21} t_{23} e^{-4i\beta}$$

.

.

. eq. 2 where $r_j$ is calculated by Fresnel's equation, and $\beta$ is the propagation constant in the film.

Thus, as can be seen in FIG. 1, the lateral beam walking caused by the thick film 104 results in light being returned from the film 104, e.g., spots 111, 113, 115, and 117, over a much larger area than the initially incident light 110, e.g., spot 111.

If film 104 were thin, on the other hand, the beam of light 110 may be assumed to be a plane wave with infinite size. Accordingly, all reflection orders may be considered to overlap, i.e., light returned from a thin film (equation 1) is returned from the same location.

The assumption that the beam of light 110 is a plane wave with infinite size is invalid when the film 104 is thick enough that the lateral shift (LS) from each reflection is on the order of the spot size as illustrated in FIG. 1. Accordingly, the light returned from a thin film (equation 1) is returned over an extended area, resulting in multiple complications. For example, unlike in a thin film, the interference of light in a thick film is not consistent across the sample surface due to the lateral shift. For example, the first reflection $r_1$ may not overlap, and hence interfere, with the 4th reflection $r_4$. Additionally, the receiver arm of an optical metrology device typically only passes light from a small region on the sample surface to the detector, illustrated in FIG. 1 as the region 119 defined by the dashed ellipse. As can be seen, the light that is returned from thick film 104 in response to the incident light 110, illustrated by spots 111, 113, 115, and 117, extends over a much larger area than the region 119 of the film that conventionally is sampled by a detector. In other words, the light that is detected from region 119 of the film, excludes a significant amount of the light returned from the thick film 104, thereby creating artifacts in the measured data, which will produce inaccurate measurement results.

Figure 2:
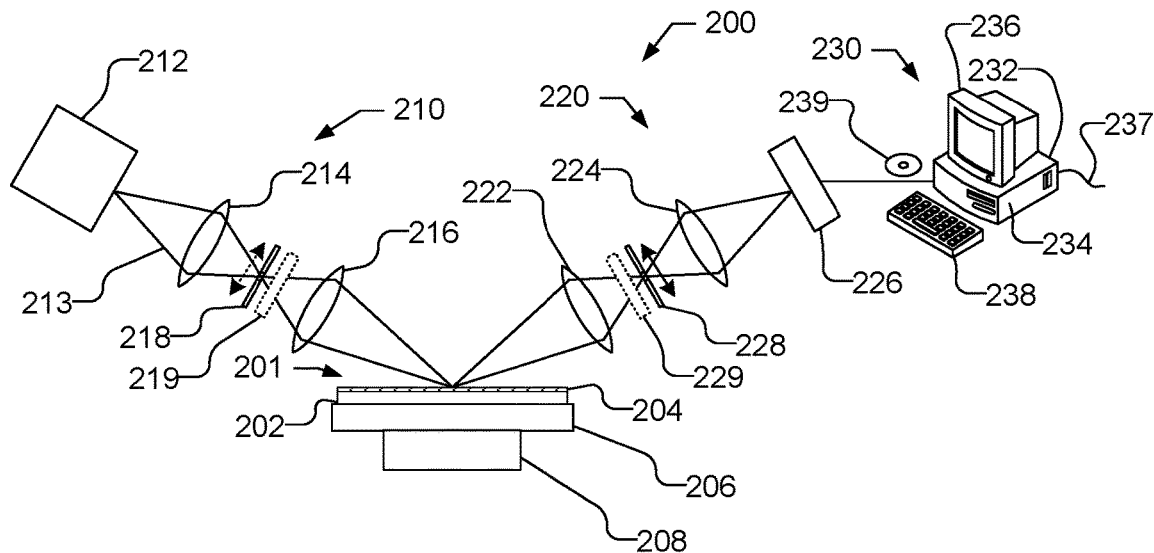
FIG. 2 illustrates an optical metrology device that may be configured to perform measurements of samples having either thin films or thick films.

FIG. 2 illustrates a schematic view of an optical metrology device 200 that may be configured to perform measurements of samples having either thin films or thick films. FIG. 2, by way of example, illustrates a sample 201, including a substrate 202 and a film, which may be either a thin film or a thick film, where the sample 201 is held on by a chuck 206 on a moveable stage 208. The stage 208, for example, may be capable of horizontal motion in either Cartesian (i.e., X and Y) coordinates, or Polar (i.e., R and θ) coordinates or some combination of the two. The stage may also be capable of vertical motion along the Z coordinate. If desired, the optical system of the optical metrology device 200 may be moveable or both the stage 208 and the optical system of the optical metrology device 200 may be moveable to produce the desired relative motion between the sample 201 and the optical system of the optical metrology device 200.

As illustrated in FIG. 2, the source arm 210 of the optical metrology device 200 includes a light source 212 that produces light 213 that is focused into a spot on the surface of the sample 201, i.e., on the film 204, by optics illustrated by lenses 214 and 216. The light source 212, for example, may be monochromatic or polychromatic, and may be, e.g., a Xenon Arc lamp and/or or a Deuterium lamp or other type of lamp(s) or laser(s) to produce desired wavelength(s). The receiver arm 220 of the optical metrology device 200 includes optics illustrated by lenses 222 and 224 and the detector 226, that receive the light 213 after interacting with the sample 201. The detector 226, for example, may be, e.g., a spectrometer, photometer, imaging device, etc., as desired per measurement application. While the lenses in FIG. 2 are illustrated as refractive optics, it should be understood that reflective optics or a combination of refractive and reflective optics may be used. Additionally, as shown in FIG. 2, the source arm 210 includes an aperture 218 and the receiver arm 220 includes a second aperture 228, where one or both of the apertures 218 and 228 are adjustable based on the thickness of the film 204 on the sample 201.

It should be understood that the optical metrology device 200 is a simplified diagram of specific components in a representative optical system but does not depict all components that may be included in the optical metrology system. For example, the optical metrology device may include additional components, such as one or more polarizing elements illustrated as polarizer 219 and analyzer 229 in the beam path. Thus, the optical system of optical metrology device 200 illustrated in FIG. 2 may be used as a reflectometer, ellipsometer, scatterometer, or other type of metrology system as desired.

FIG. 2 further illustrates a processor 230 receives the data from the detector 226 and may be used to control various components in optical metrology device, such as one or both of the apertures 218, 228, polarizer 219, analyzer 229, chuck 206, and stage 208 to perform the desired measurement operations on the sample 201. The processor 230 may be a computer, such as a workstation, a personal computer, central processing unit or other adequate computer system, or multiple systems. The processor 230 is preferably included in, or is connected to or otherwise associated with optical metrology device 200. The processor 230 may also collect and analyze the data obtained from the detector 226. For example, the processor 230 may analyze the data to determine one or more physical characteristics of the sample 201 whether the sample 201 includes a thick film or a thin film, e.g., using modeling techniques. The processor 230, which includes at least one processing unit 232 with memory 234, as well as a user interface including e.g., a display 236 and input devices 238. A non-transitory computer-usable storage medium 239 having computer-readable program code embodied may be used by the processor 230 for causing the at least one processor to control the optical metrology device 100 and to perform the functions including the analysis described herein. The data structures and software code for automatically implementing one or more acts described in this detailed description can be implemented by one of ordinary skill in the art in light of the present disclosure and stored, e.g., on the non-transitory computer-usable storage medium 239, which may be any device or medium that can store code and/or data for use by a computer system such as the at least one processing unit 232. The computer-usable storage medium 239 may be, but is not limited to, magnetic and optical storage devices such as disk drives, magnetic tape, compact discs, and DVDs (digital versatile discs or digital video discs). A communication port 237 may also be used to receive instructions that are used to program the processor 230 to perform any one or more of the functions described herein and may represent any type of communication connection, such as to the internet or any other computer network. The communication port 237 may further export signals, e.g., with measurement results and/or instructions, to another system, such as external process tools, in a feed forward or feedback process in order to adjust a process parameter associated with a fabrication process step of the samples based on the measurement results. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described.

As illustrated by the arrows in FIG. 2, one or both of apertures 218 and 228 may be adjusted to configure the aperture based on the thickness of the film 204 on the sample 201. For example, aperture 228 in the receiver arm 220 may be adjusted to have a first aperture configuration if the film 204 is thin and may be adjusted to have a second aperture configuration if the film 204 is thick, where the second aperture configuration allows more light to pass than the first aperture configuration. The aperture 218 in the source arm 210 may optionally be adjusted, but is not required to be adjusted, when aperture 228 is adjusted.

By way of example, the thickness of the film may be characterized by the relationship between the lateral shift (LS) illustrated in FIG. 1 and the measurement spot size. For example, a film may be considered thick depending on several parameters in addition to the actual thickness of the film. The angle of incidence of the light and the refractive index of the materials will alter the angle of internal reflection of the light, and as can be seen in FIG. 1, with a greater the angle of reflection, a larger lateral shift LS will be produced. Additionally, the measurement spot size determines whether beam walking will have an effect on the measurement results, e.g., with a large measurement spot size, beam walking will have less affect. Accordingly, by way of example, a film may be referred to as thick if the lateral shift from each internal reflection in the film is more than approximately 80% of the spot size, although a film may be considered to be thick if the lateral shift is less than 80%, e.g., 20%50% of the spot size, or a film may not be considered to be thick until the lateral shift is more than 80%, e.g., 90%, of the spot size. Alternatively, the film may be considered to be thick, e.g., if it has a thickness greater than a predetermined thickness, e.g., 10 µm or greater. It should be understood that the thickness of the film may be characterized in other manners. For example, a film may be characterized as thick if the inaccuracies in the measurement result due to lateral beam walking exceed a desired tolerance, and thus, may be user defined. For example, whether a film is considered thick may depend on a particular metrology application. By way of example, in implementations where only film thickness is being measured (e.g., fit to a model), minor distortions of the measurement data resulting from lateral beam walking may be tolerable. On the other hand, in implementations where multiple sample parameters are being extracted, e.g., as is common in Optical Critical Dimension (OCD) measurements, measurement data is more critical, and accordingly, the tolerance in the degradation of the measurement data due to lateral beam walking may be much smaller. In one implementation, it may be desirable for the user to select whether a film is to be considered thick or thin for a particular metrology device on an application by application basis. In one implementation, a film may be considered thick based on the affect it has on the light received from the sample, e.g., if the lateral beam shift caused by the thickness of the film affects the detected light by more than a predetermined threshold, the film may be considered to be thick.

The aperture 228 in the receiver arm 220 may be adjusted to alternate between a standard aperture and an enlarged aperture (or no aperture) based on the thickness of the film on the sample 201. The aperture 228 may be adjusted in several different ways to use the first aperture configuration on a standard thin film or to use the second aperture configuration which allows more light to pass than the first aperture configuration on a thick film.

Figure 3:
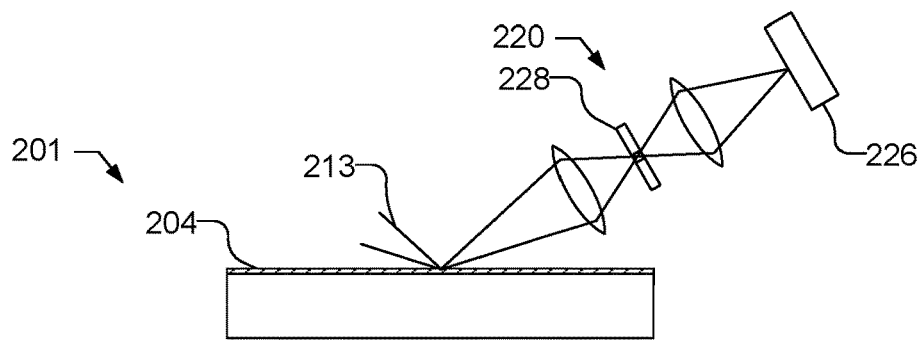
FIG. 3 illustrates the receiver arm of the optical metrology device with the aperture configured to measure a thin film on a sample.

FIGS. 3, 4, 5, and 6, by way of example, illustrate a portion of the light 213 incident on the sample 201 and the receiver arm 220 of the optical metrology device, with the aperture 228 adjusted in different configurations based on the thickness of the film 204 on the sample 201. For example, FIG. 3 illustrates the film 204 as being relatively thin, e.g., the lateral shift from each internal reflection in the film 204 is less than 80% of the spot size, or the film is less than 10 µm thick. The aperture 228, as shown in FIG. 3, is adjusted to have a first aperture configuration, which may be matched to the size of the aperture 218 in the source arm 210, shown in FIG. 2. Because the aperture 228 in the receiver arm 220 is matched to the aperture 218 in the source arm 210, the light received by the detector 226 is from an area of the sample 201 that is approximately the same as (and coincident with) the measurement spot.

Figure 4:
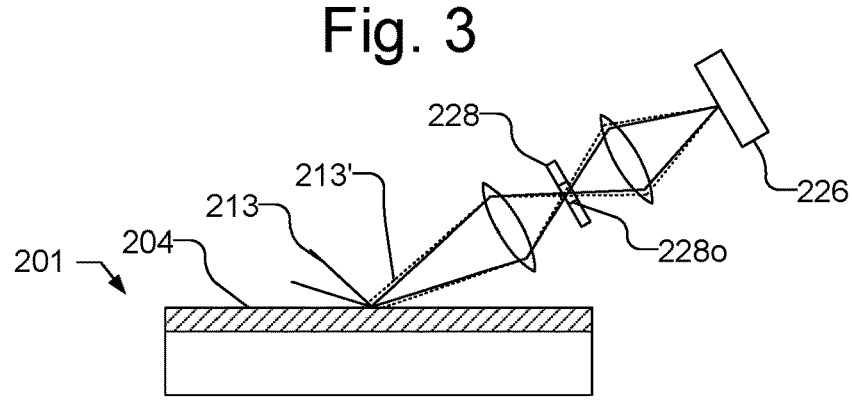
FIGS. 4-6 illustrate the receiver arm of the optical metrology device with various adjustments to the aperture to measure a thick film on a sample.
Figure 5:
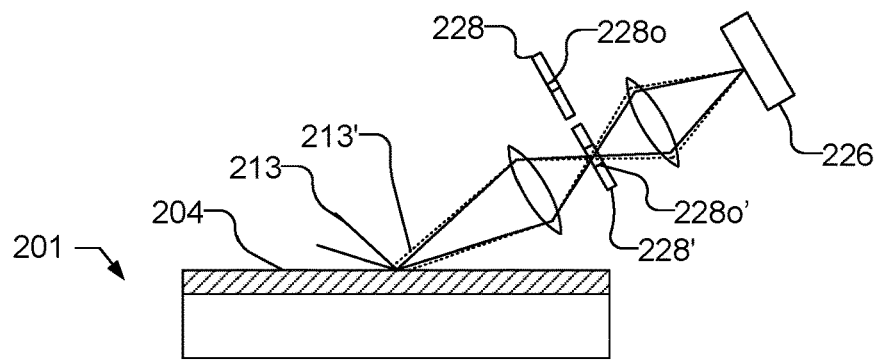
Figure 6:
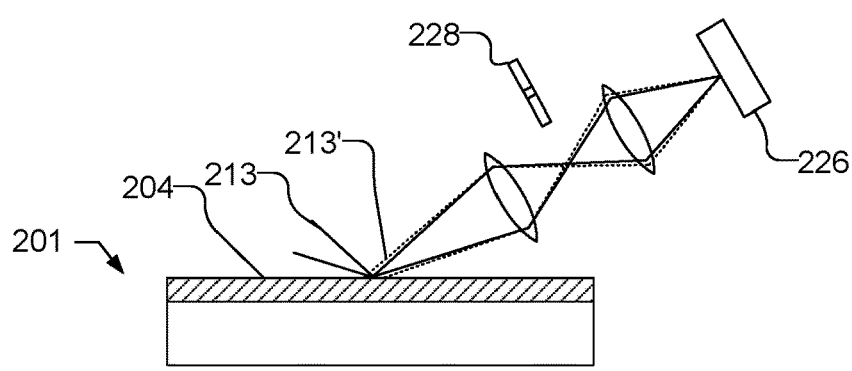

FIGS. 4, 5, and 6, on the other hand, illustrates the sample 201 with a film 204 that is considered to be thick, e.g., the lateral shift from each internal reflection in the film 204 is at least 80% of the spot size, or the film is 10µm thick or more. When the film 204 is thick, the aperture 228 in the receiver arm 220 may be adjusted to a second aperture configuration that allows more light to pass in the beam path than the first aperture configuration. The aperture 228 may be adjusted in several different ways. For example, as illustrated in FIG. 4, the size of the opening 228o in the aperture 228 may be increased in size. By increasing the size of the opening 228o, the aperture 228 in the receiver arm 220 no longer matches the aperture 218 in the source arm 210 and the light received by the detector 226 is from an area of the sample 210 that is larger than the measurement spot, as illustrated by the dotted ray lines 213'.

In another implementation, to adjust the aperture 228 to the second aperture configuration, the aperture 228 may be moved. For example, as illustrated in FIG. 5, the aperture 228, which has an opening 228o with a first size, may be moved and physically replaced with a second aperture 228', which has an opening 228o' with a second size that is larger than opening 2280. By replacing the aperture 228 with a second aperture 228' with a larger opening 228o', the aperture 228' in the receiver arm 220 no longer matches the aperture 218 in the source arm 210 and the light received by the detector 226 is from an area of the sample 210 that is larger than the measurement spot, as illustrated by the dotted ray lines 213'.

FIG. 6 illustrates another example of moving the aperture 228 to produce a second aperture configuration. As illustrated in FIG. 6, the aperture 228 is moved out of the beam path, but is not replaced with a different aperture. By adjusting the aperture 228 in the receiver arm 220 to remove it from the beam path, there is no longer an aperture in the receiver arm 220 that matches the aperture 218 in the source arm 210 and the light received by the detector 226 is from an area of the sample 210 that is larger than the measurement spot, as illustrated by the dotted ray lines 213'.

Figure 7:
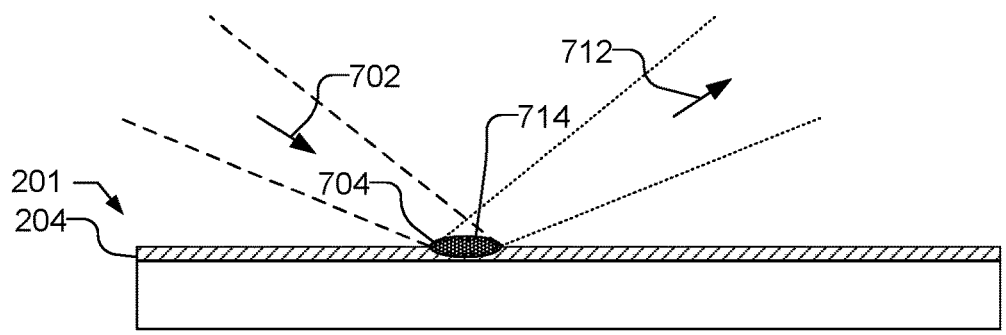
FIG. 7 illustrates a side view of a sample with a thin film and illustrates a measurement spot and the detected area on the sample as approximately the same size and coincident.

FIG. 7 illustrates, with dashed lines and by arrow 702, the light that is incident on the sample 201 to form a measurement spot 704 and illustrates, with dotted lines and by arrow 712, the light received by the detector 226 (shown in FIG. 2) from an area 714 on the sample 201. The film 204 in FIG. 7 is relative thin, e.g., the lateral shift from each internal reflection in the film 204 is less than 80% of the size of measurement spot 704, or the film is less than 10 µm thick, and accordingly, the aperture 228 in the receiver arm 220 is adjusted to have a first aperture configuration (as illustrated in FIG. 3). Accordingly, as illustrated in FIG. 7, the area 714 from which light is detected on the sample 201 is approximately the same as and is coincident with the measurement spot 704.

Figure 8:
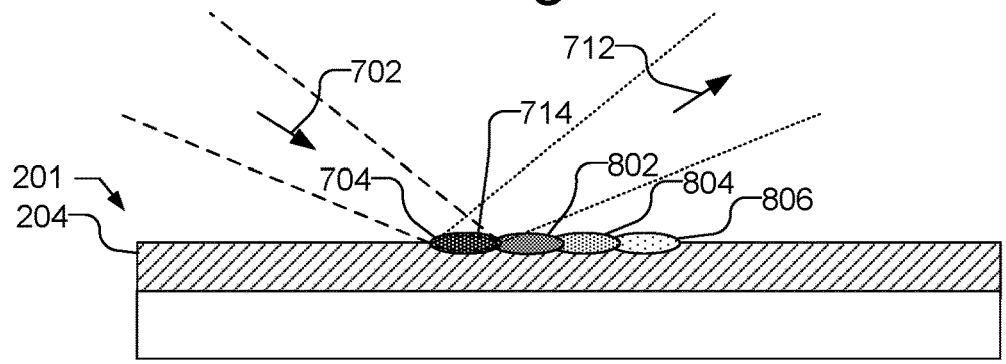
FIG. 8 illustrates a side view of a sample with a thick film causing lateral beam walking of the incident light and illustrates the exclusion of light that is detected due to the aperture in the receiver arm being configured to measure a thin film.

FIG. 8 is similar to FIG. 7, but illustrates film 204 as being relative thick, e.g., the lateral shift from each internal reflection in the film 204 is at least 80% of the spot size, or the film is 10 µm thick or more, producing beam walking, illustrated by a number of spots 802, 804, and 806 on the surface of the film 204 that are in addition to the measurement spot 704 from the incident light (shown with dashed lines and arrow 702). If the aperture 228 in the receiver arm 220 is not adjusted when film 204 is thick, the detector 226 (shown in FIG. 2) will receive light (illustrated with dotted lines and arrow 712, over an area 714 that is approximately the same as and is coincident with the measurement spot 704 (i.e., the spot produced by the incident light), but will not receive light resulting from the lateral shift within the film 204, illustrated as spots 802, 804, and 806. Accordingly, analysis of the detected light collected from only area 714 will produce an inaccurate measurement of the sample 201.

Figure 9:
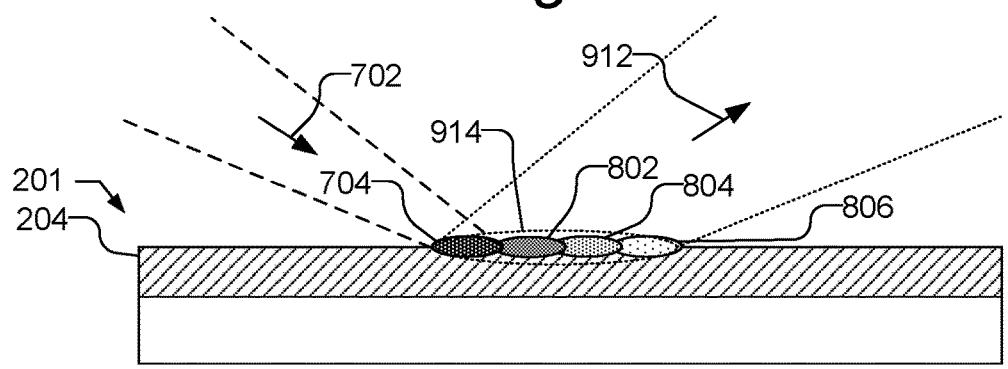
FIG. 9 illustrates a side view of a sample with a thick film causing lateral beam walking of the incident light and illustrates the inclusion of light that is detected due to the aperture in the receiver arm being configured to measure a thick film.

FIG. 9 is similar to FIG. 8, but illustrates an increased area 914 from which light is detected on the sample 201 due to the aperture 228 in the receiver arm 220 being adjusted to have the second aperture configuration (as illustrated in FIGS. 4-6), in which more light passes than the first aperture configuration. As can be seen in FIG. 9, the adjustment of the aperture 228 to the second aperture configuration to that light is collected over area 914 permits the detection of light from lateral shift within the film 204, illustrated as spots 802, 804, and 806. Accordingly, analysis of the detected light collected from area 914 will produce a more accurate measurement of the sample 201 than light from only area 714, shown in FIG. 8. It is noted that while the collection of light from an increased area 914 is useful because it permits collecting more of the spots 802, 804, and 806, there may still be inaccuracies due to the change in interference caused by the beam walking, as discussed above.

Referring back to FIG. 2, in another implementation, aperture 218 in the source arm 210, as opposed to the aperture 228 in the receiver arm 220, may be adjusted to have a first aperture configuration if the film 204 is thin and may be adjusted to have a second aperture configuration if the film 204 is thick, where the second aperture configuration allows more light to pass than the first aperture configuration. The aperture 228 in the receiver arm 220 may optionally be adjusted, but is not required to be adjusted, when aperture 218 is adjusted.

By increasing the light that passes through aperture 218 in the source arm 210, the measurement spot size on the surface of the sample is increased. As discussed above, with a large measurement spot size, beam walking will have less affect. It should be noted that in the present implementation, the film may be referred to as thick when the lateral shift from each internal reflection in the film is more than 20%, 50%, 80% or 90% of the spot size produced by the first aperture configuration of the aperture 218, as opposed to the second aperture configuration, which will produce a larger measurement spot size.

The aperture 218 in the source arm 210 may be adjusted to alternate between a standard aperture and an enlarged aperture (or no aperture) based on the thickness of the film on the sample 201. The aperture 218 may be adjusted in several different ways to use the first aperture configuration on a standard thin film or to use the second aperture configuration which allows more light to pass than the first aperture configuration on a thick film.

Figure 10:
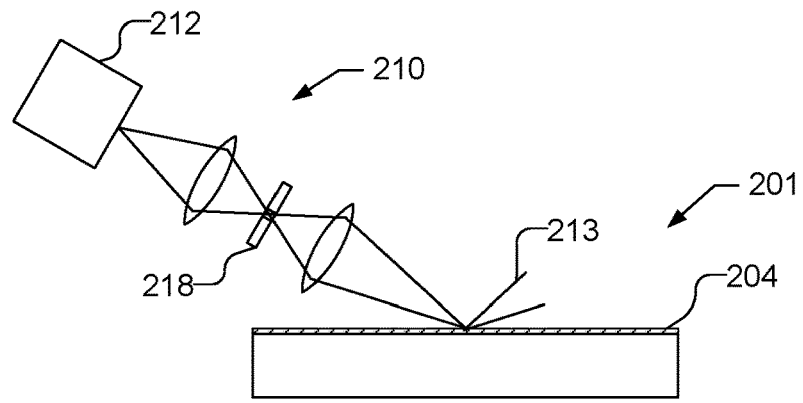
FIG. 10 illustrates the source arm of the optical metrology device with the aperture configured to measure a thin film on a sample.

FIGS. 10, 11, 12, and 13, by way of example, illustrate the source arm 210 of the optical metrology device 200 and light 213 reflected from the sample 201 with the aperture 218 adjusted in different configurations based on the thickness of the film 204 on the sample 201. For example, FIG. 10 illustrates the film 204 as being relatively thin, e.g., the lateral shift from each internal reflection in the film 204 is less than 80% of the spot size, or the film is less than 10µm thick. The aperture 218, as shown in FIG. 10, is adjusted to have a first aperture configuration, which may be matched to the size of the aperture 228 in the receiver arm 220, shown in FIG. 2. As discussed in reference to FIG. 3, with the aperture 218 in the source arm 210 matching the aperture 228 in the receiver arm 220, the light received by the detector 226 is from an area of the sample 210 that is approximately the same as (and coincident with) the measurement spot.

Figure 11:
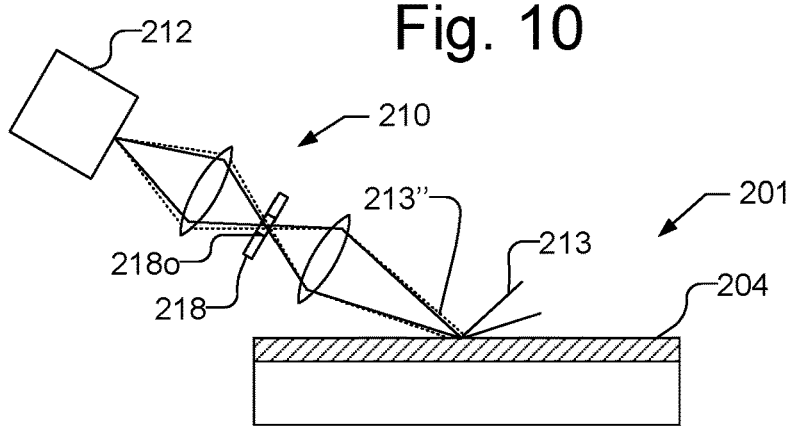
FIGS. 11-13 illustrate the receiver arm of the optical metrology device with various adjustments to the aperture to measure a thick film on a sample.
Figure 12:
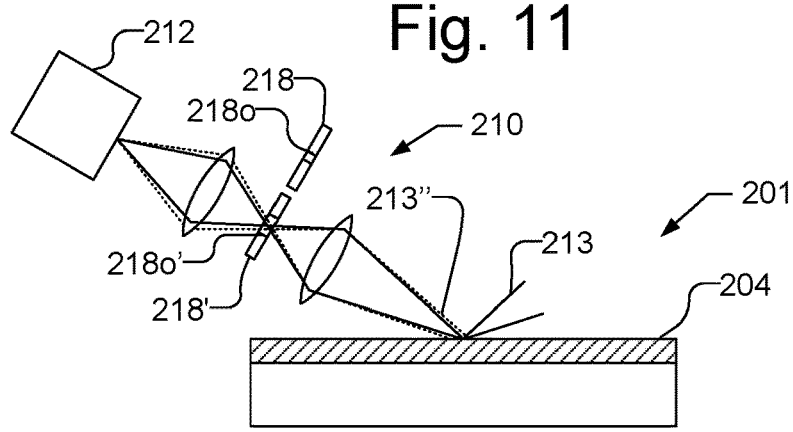
Figure 13:
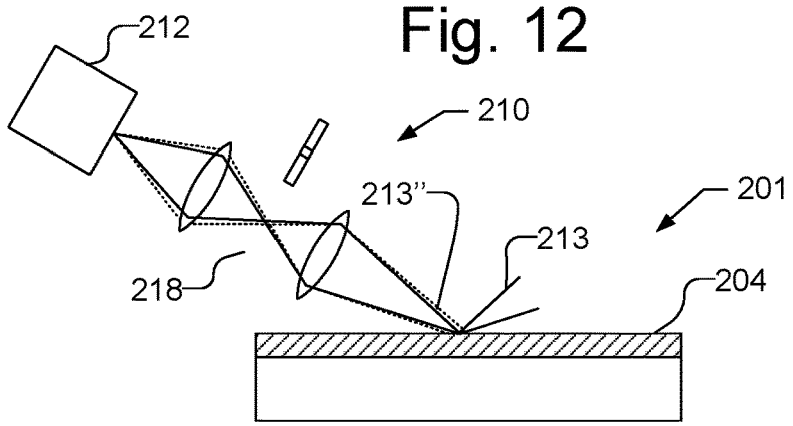

FIGS. 11, 12, and 13, on the other hand, illustrates the sample 201 with a film 204 that is considered to be thick, e.g., the lateral shift from each internal reflection in the film 204 is at least 80% of the spot size produced by the first aperture configuration of aperture 218, or the film is 10 µm thick or more. When the film 204 is thick, the aperture 218 in the source arm 210 may be adjusted to a second aperture configuration that allows more light to pass in the beam path than the first aperture configuration. The aperture 218 may be adjusted in several different ways. For example, as illustrated in FIG. 11, the size of the opening 218o in the aperture 218 may be increased in size. By increasing the size of the opening 218o of the aperture 218, more light passes through the aperture, as illustrated by the dotted ray lines 213", and the measurement spot size is increased, which reduces the effect of beam walking. The aperture 228 in the receiver arm 220 may not be adjusted, so that aperture 228 does not match aperture 218 and the light received by the detector 226 is from an area of the sample 210 that is smaller than the measurement spot, but has little or no effects from beam walking.

In another implementation, to adjust the aperture 218 to the second aperture configuration, the aperture 218 may be moved. For example, as illustrated in FIG. 12, the aperture 218, which has an opening 218o with a first size, may be moved and physically replaced with a second aperture 218', which has an opening 218o' with a second size that is larger than opening 218o. By replacing the aperture 218 with a second aperture 218' with a larger opening 218o', the measurement spot size is increased and the effect of beam walking is reduced. Thus, the light received by the detector 226 has little or no effects from beam walking.

FIG. 13 illustrates another example of moving the aperture 218 to produce a second aperture configuration. As illustrated in FIG. 13, the aperture 218 is moved out of the beam path, but is not replaced with a different aperture. By adjusting the aperture 218 in the source arm 210 to remove it from the beam path, the measurement spot size is increased and the effect of beam walking is reduced. Thus, the light received by the detector 226 has little or no effects from beam walking.

Figure 14:
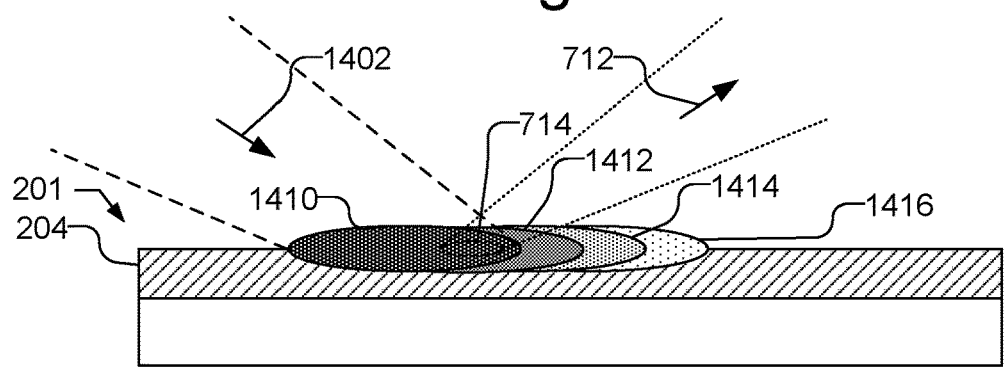
FIG. 14 illustrates a side view of a sample with a thick film causing lateral beam walking of the incident light and illustrates an increased measurement spot size from the aperture in the source arm being configured to measure a thick film to reduce the effects of lateral beam walking.

When the film 204 is relatively thin and the aperture 218 has a first aperture configuration, the area 714 from which light is detected on the sample 201 is approximately the same as and is coincident with the measurement spot 704, as illustrated in FIG. 7. FIG. 14, on the other hand, illustrates the film 204 as being relatively thick, similar to FIGS. 8 and 9, but illustrates the effect of adjusting the aperture 218 to have the second aperture configuration (as illustrated in FIGS. 11-13), in which more light passes than the first aperture configuration. The incident light, illustrated with dashed lines and arrow 1402 produces a measurement spot 1410 that is larger, e.g., increased area, relative to the measurement spot 704 produced when aperture 218 has the first aperture configuration, as illustrated in FIG. 7. As illustrated in FIG. 14, due to the enlarged size of the measurement spot 1410, the lateral shift from the internal reflection in the film 204 will be a smaller percentage of the spot size, and the effects of beam walking will be reduced, as illustrated by spots 1412, 1414, and 1416 significantly overlapping. Accordingly, the area 714 from which light is detected on the sample 201 is smaller than, but coincident with the measurement spot 1410 and a significant number of the laterally shifted spot 1412, 1414, and 1416. Moreover, as the laterally shifted spots 1412, 1414, and 1416 overlap, there should be little change in interference between the spots due to beam walking. Accordingly, it is believed that the analysis of the detected light collected from area 714 will produce an accurate measurement of the sample 201.

Figure 15A:
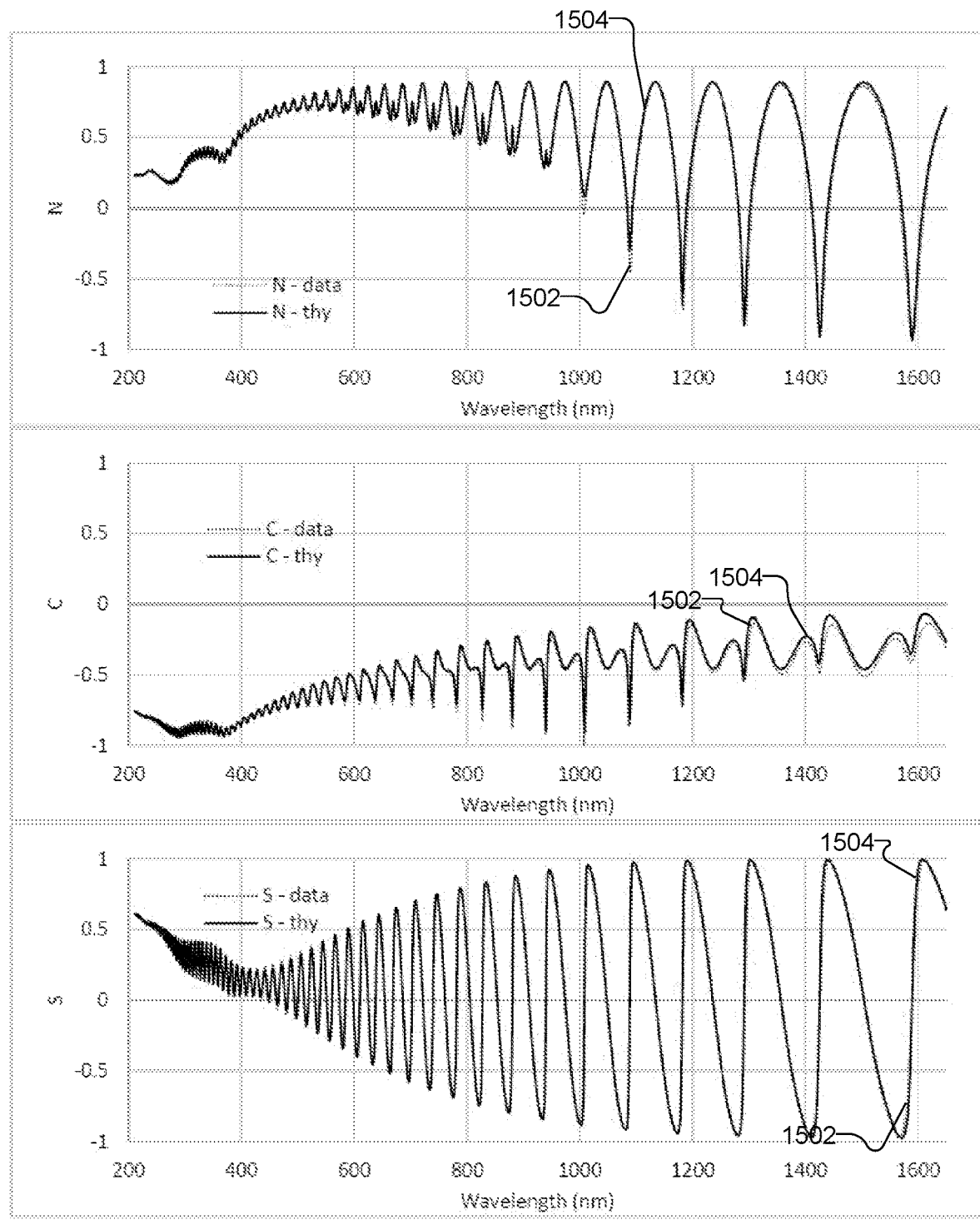
FIG. 15A illustrates data conventionally measured from a 6 µm film by a spectroscopic ellipsometer and theoretical data fit to the measured data by conventional modeling.
Figure 15B:
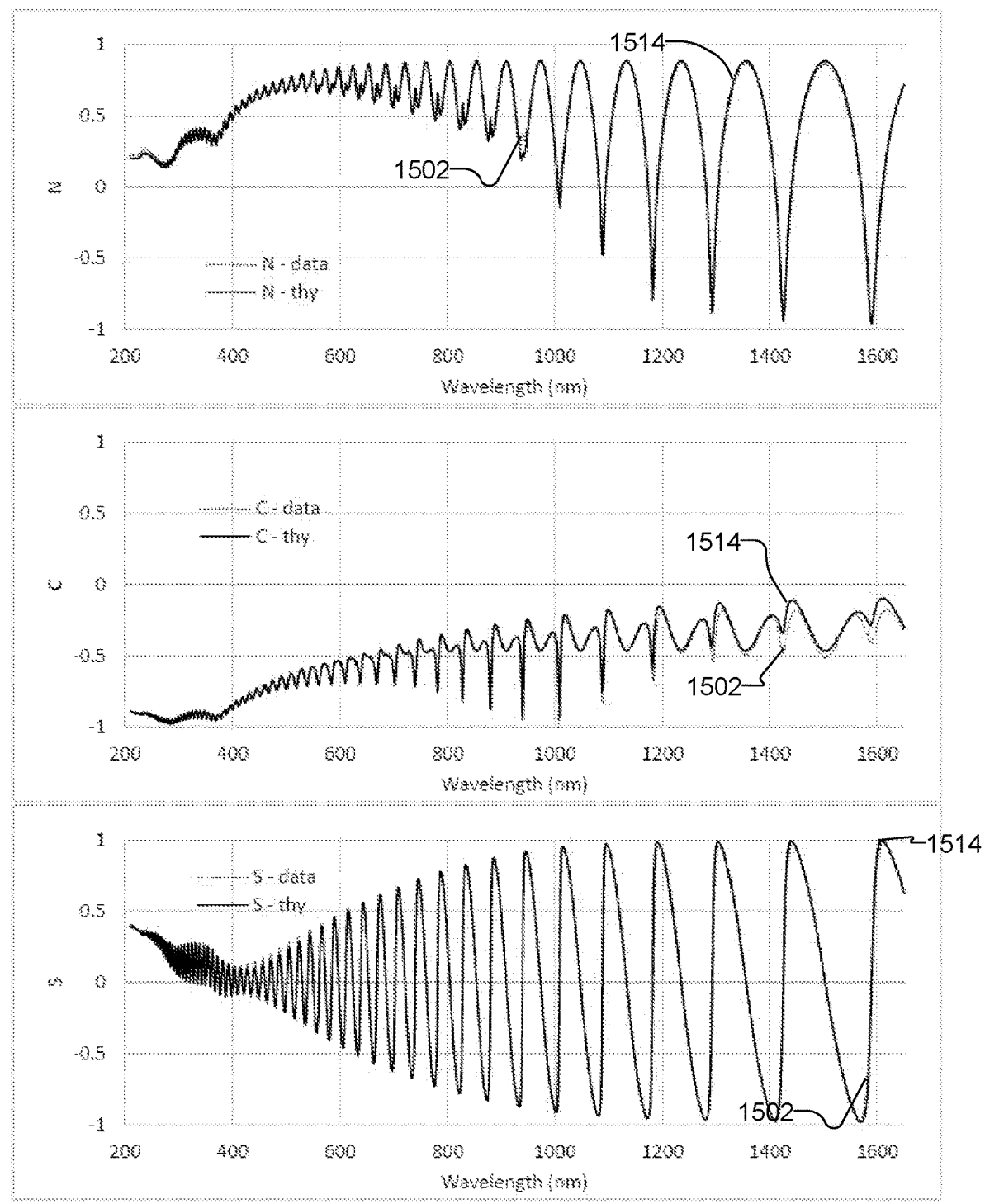
FIG. 15B illustrates data conventionally measured from the 6 µm film by the spectroscopic ellipsometer and theoretical data fit to the measured data by modeling lateral beam walking.
Figure 15C:
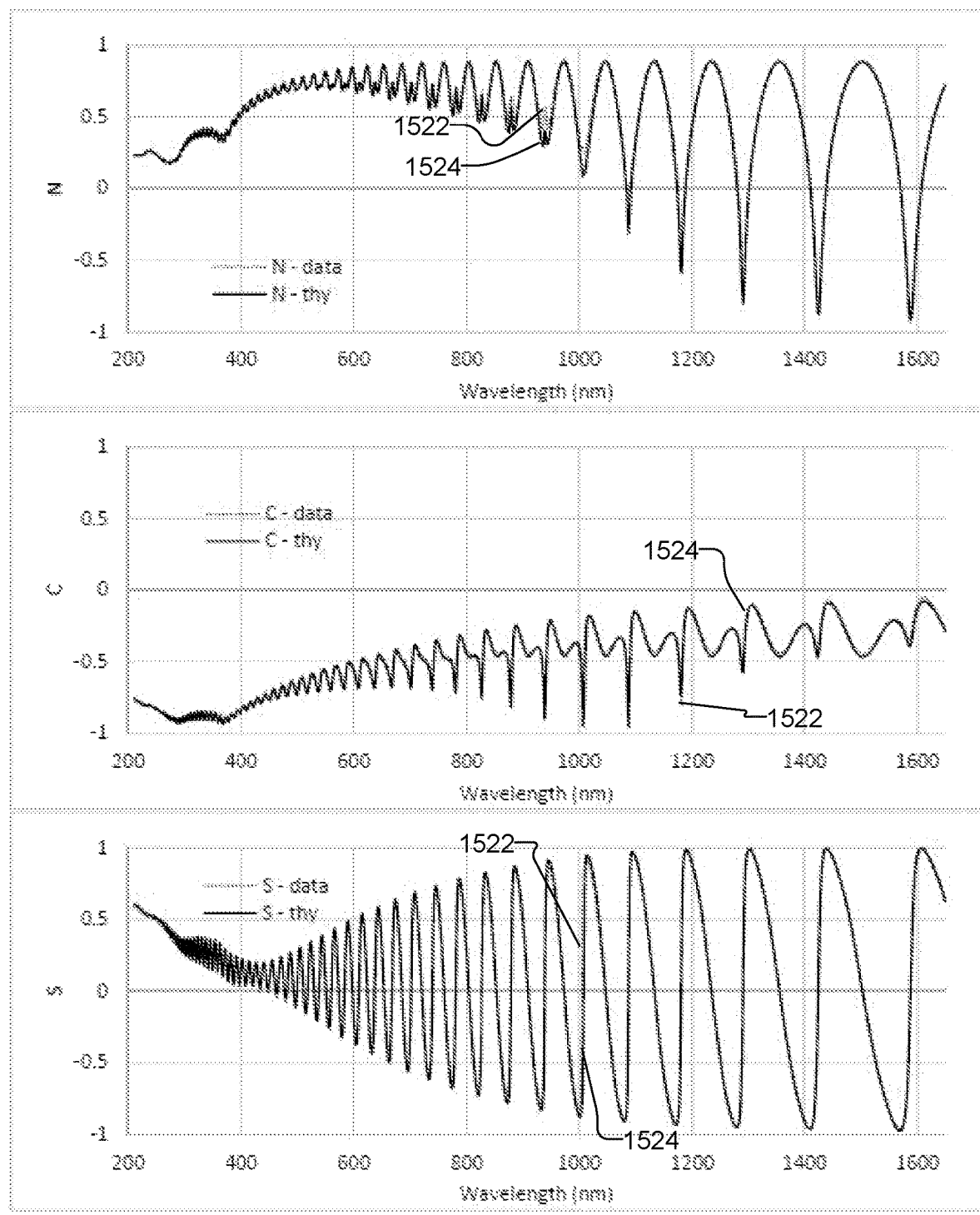
FIG. 15C illustrates data measured from a 6 µm film by a spectroscopic ellipsometer using an aperture configured to measure a thick film and theoretical data fit to the measured data by conventional modeling.

FIGS. 15A-15C and 16A-16C illustrate the effects of lateral beam walking due to a thick film on spectroscopic ellipsometer measurements and attempting to counter the effects by modeling the beam walking and by adjusting the aperture in the receive arm to have a second aperture configuration that allows more light to pass in the beam path than the first aperture configuration, used with thin films. FIGS. 15A-15C illustrate ellipsometry N, C, and S measurements of a sample with a single 6 µm film using a spectroscopic ellipsometer having a spot size of approximately 20 µm and theoretical data modeled to fit the measured data, where N, C, and S are related to the familiar ellipsometric values of ψ and Δ through the following: N=cos(2ψ), C=sin(2ψ)*cos(Δ), and S=sin(2ψ)*sin(Δ). In FIG. 15A, the data is measured with the aperture in the receive arm of the spectroscopic ellipsometer having a first aperture configuration, i.e., matched to the aperture in the source arm. In FIG. 15A, curves 1502 represent measured data and curves 1504 represent theoretical data modeled to fit the measured data, wherein the model does not account for beam walking. FIG. 15B illustrates the same measured data as FIG. 15A, represented with curves 1502, and illustrates theoretical data, represented by curves 1514, that is modeled to fit the measured data using a model that approximates the effect of beam walking. In FIG. 15C curves 1522 represent data measured with the aperture in the receive arm of the spectroscopic ellipsometer adjusted to have the second aperture configuration, specifically, the aperture is removed from the beam path (as illustrated in FIG. 6), and curves 1524 represent theoretical data that is modeled to fit the measured data, wherein the model does not account for beam walking.

Figure 16A:
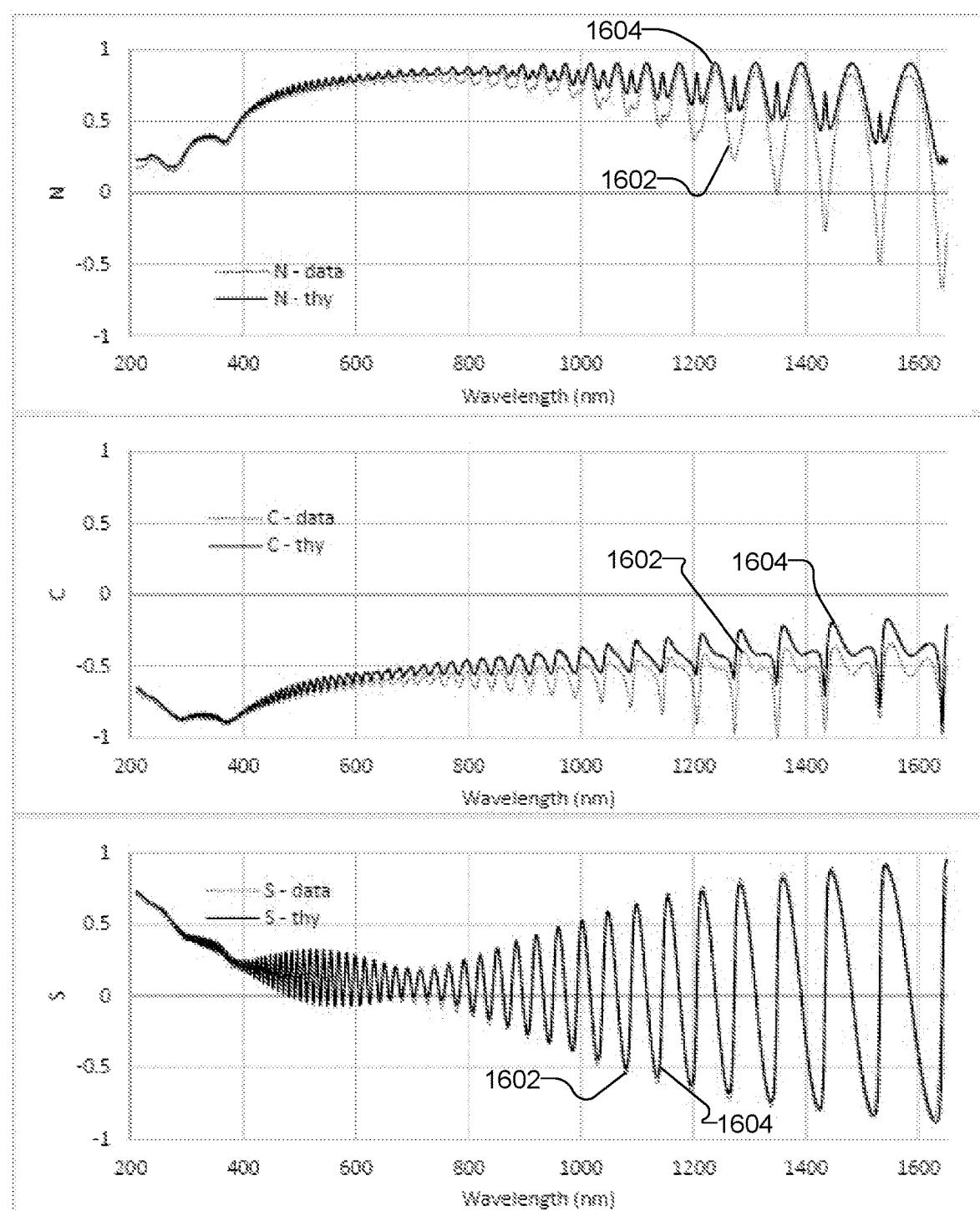
FIG. 16A illustrates data conventionally measured from a 10 µm film by a spectroscopic ellipsometer and theoretical data fit to the measured data by conventional modeling.
Figure 16B:
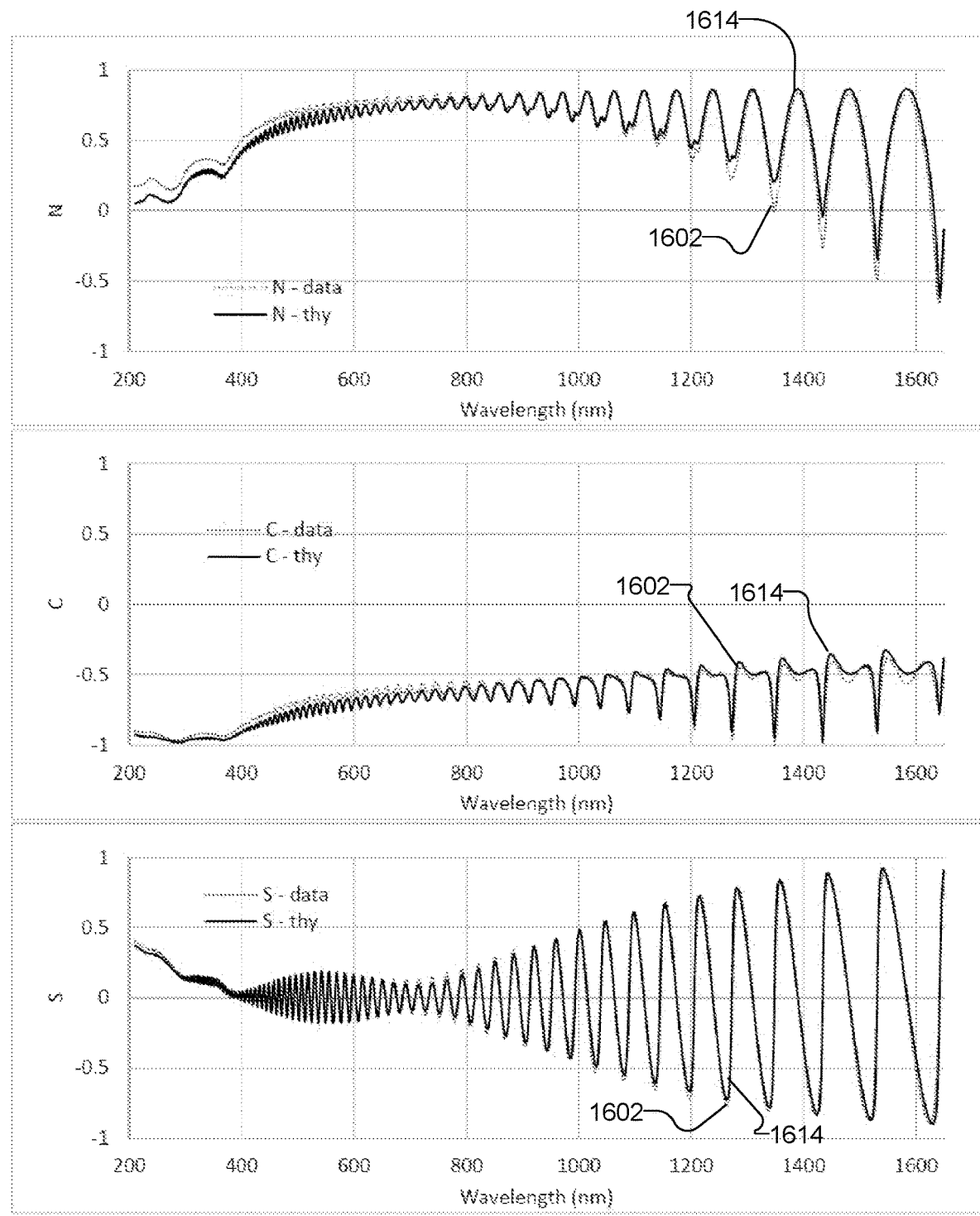
FIG. 16B illustrates data conventionally measured from the 10 µm film by the spectroscopic ellipsometer and theoretical data fit to the measured data by modeling lateral beam walking.
Figure 16C:
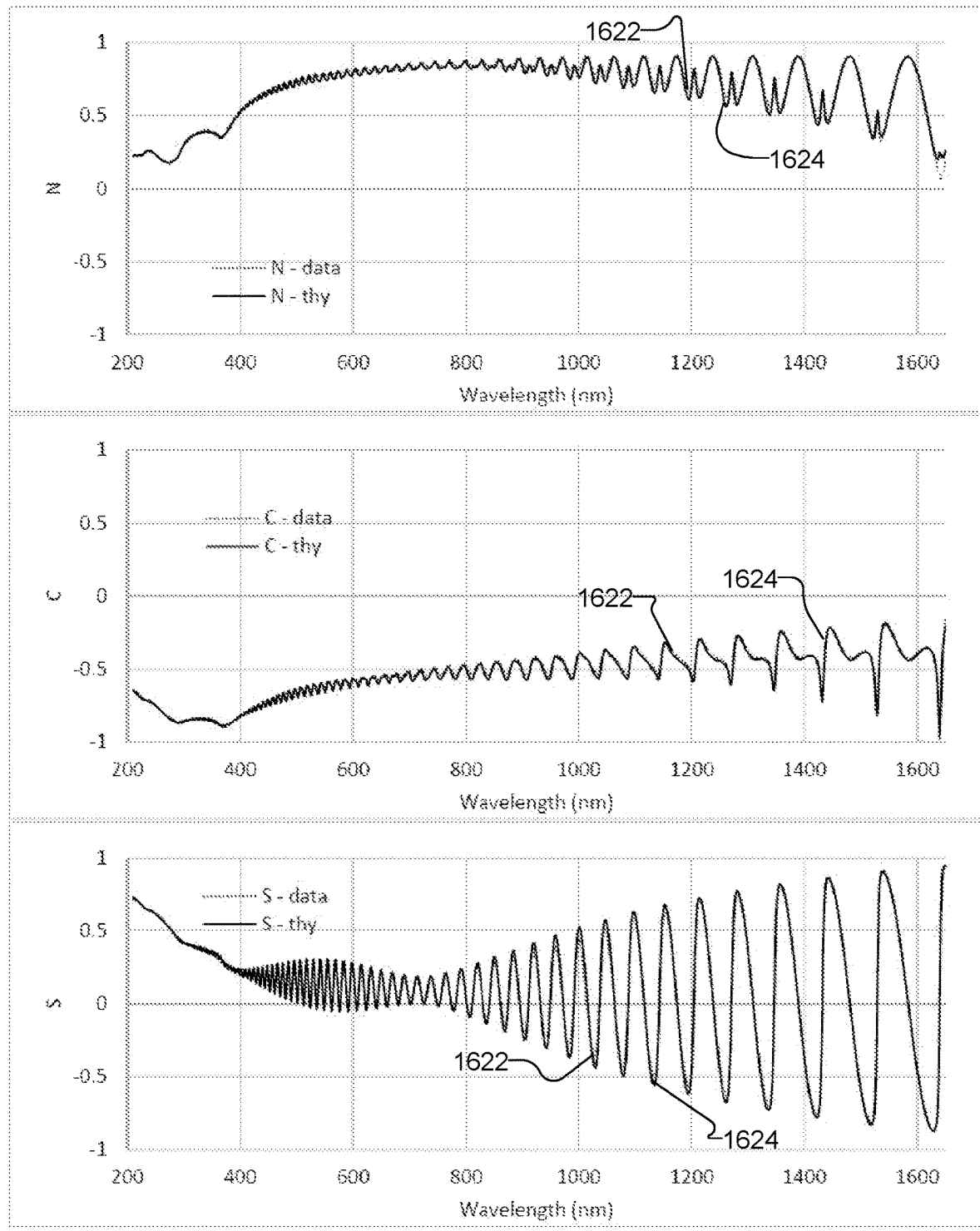
FIG. 16C illustrates data measured from a 10 µm film by a spectroscopic ellipsometer using an aperture configured to measure a thick film and theoretical data fit to the measured data by conventional modeling.

FIGS. 16A-16C, similar to FIGS. 15A-15C, illustrate N, C, and S measurements of a sample with a single using a spectroscopic ellipsometer having a spot size of approximately 20 µm and theoretical data modeled to fit the measured data. In FIGS. 16A-16C, however, the sample has a significantly thicker film of 10m, as opposed to 6 µm represented in FIGS. 15A-15C. In FIG. 16A, similar to FIG. 15A, the data is measured with the aperture in the receive arm of the spectroscopic ellipsometer having a first aperture configuration, i.e., matched to the aperture in the source arm, where curves 1602 represent the measured data and curves 1604 represent theoretical data modeled to fit the measured data, wherein the model does not account for beam walking. As can be seen by comparing FIGS. 16A and 15A, while the effects of beam walking are present in FIG. 15A, the effects are significantly more pronounced with a film that is 10 µm thick, as opposed to 6 µm.

FIG. 16B illustrates the same measured data as FIG. 16A, represented with curves 1602, and illustrates theoretical data, represented by curves 1614, that is modeled to fit the measured data using a model that approximates the effect of beam walking. In FIG. 16C, curves 1522 represent data measured with the aperture in the receive arm of the spectroscopic ellipsometer adjusted to have the second aperture configuration, specifically, the aperture is removed from the beam path (as illustrated in FIG. 6), and curves 1624 represent theoretical data that is modeled to fit the measured data, wherein the model does not account for beam walking.

As can be seen in FIG. 16B, using a model that accounts for the effects of beam walking improves the fit to conventionally acquired data of a sample having a thick film. The fit shown in FIG. 16C, however, by adjusting the aperture, results in a superior fit of the theoretical data using conventional modeling. Thus, the fit produced through modeling the beam walking (as illustrated in FIG. 16B) produces an inferior fit to the data and requires an extremely heavy calculation load, thereby increasing power requirements, resource requirements, such as memory and processing units, and calculation time (i.e., reducing throughput), relative to the use of conventional modeling, as used in FIG. 16C.

Figure 17:
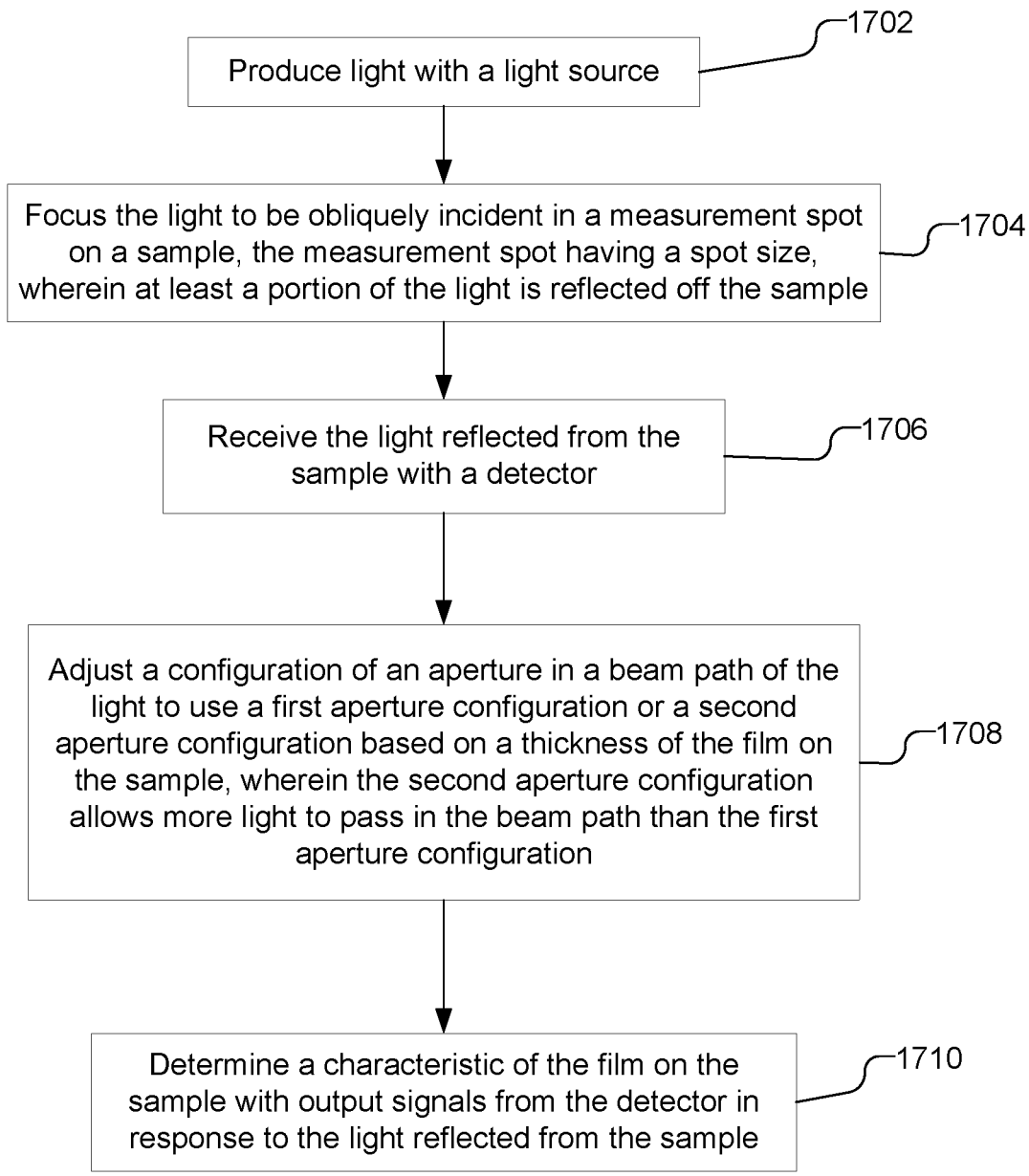
FIG. 17 is a flow chart illustrating a method of determining a characteristic of a film on a sample with an optical metrology device with an aperture that may be configured to measure either thin films or thick films.

FIG. 17 is a flow chart illustrating a method of determining a characteristic of a film on a sample with an optical metrology device, which may be, e.g., a reflectometer, ellipsometer, scatterometer, etc. As illustrated at block 1702 in FIG. 17, light is produced with a light source. At block 1704, the light is focused to be obliquely incident in a measurement spot on a sample, the measurement spot having a spot size, wherein at least a portion of the light is reflected off the sample. At block 1706, the light reflected from the sample is received with a detector. At block 1708, a configuration of an aperture in a beam path of the light is adjusted to use a first aperture configuration or a second aperture configuration based on a thickness of the film on the sample, wherein the second aperture configuration allows more light to pass in the beam path than the first aperture configuration. It should be understood that the adjustment of the aperture in the beam path at block 1706 may be performed prior to blocks 1702-1706. At block 1710, a characteristic of the film on the sample is determined with output signals from the detector in response to the light reflected from the sample.

In one implementation, the aperture is adjusted to the first aperture configuration if the thickness of the film is small enough that a lateral shift from each internal reflection in the film is less than 80% of the spot size, and adjusted to the aperture to the second aperture configuration if the thickness of the film is large enough that the lateral shift from each internal reflection in the film is at least 80% of the spot size.

In one implementation, the aperture is adjusted to the first aperture configuration if the thickness of the film is less than a predefined thickness, and the aperture is adjusted to the second aperture configuration if the thickness of the film is at least the predefined thickness.

In one implementation, the aperture is adjusted to the first aperture configuration if the thickness of the film is not large enough to produce inaccuracies in the characteristic of the film greater than a predefined tolerance due to lateral beam shift of the light, and the aperture is adjusted to the second aperture configuration if the thickness of the film is large enough to produce inaccuracies in the characteristic of the film greater than the predefined tolerance due to the lateral beam shift of the light.

In one implementation, the method may further include receiving a first reflected light from the sample or another sample, such as a reference sample, with the detector using the first aperture configuration, receiving a second reflected light from the sample or the other sample with the detector using the second aperture configuration, and comparing the first reflected light and the second reflected light. For example, the difference between the first reflected light and the second reflected light, e.g., spectral discrepancies, may be determined and compared to a predetermined threshold. The aperture may be adjusted to the first aperture configuration if a difference between the first reflected light and the second reflected light is not greater than a predetermined threshold, and the aperture is adjusted to the second aperture configuration if the difference between the first reflected light and the second reflected light is greater than the predetermined threshold.

In some implementations, a signal may be communicated to a process tool that causes the process tool to adjust a process parameter associated with a fabrication process step of the sample fabrication sequence based on the determined characteristic of the test sample. Thus, the characteristic of the sample, such as thickness and optical constants, e.g., refractive index n and extinction coefficient k of various layers, including the film on the sample, and other characteristics, including the geometries of a structure, such as various critical dimensions of a repeating set of fins or lines, line shapes, etch undercuts, etc., may be used to modify, alter, or inform further processing of the test sample or the processing of subsequently processed samples, e.g., in a feed forward or feedback process. In this regard, measurement results may be exported to another system.

In some implementations, the configuration of the aperture may be adjusted by placing a first aperture with the first aperture configuration in the beam path or placing a second aperture with the second aperture configuration in the beam path, wherein the second aperture has an opening that is larger than an opening in the first aperture. In some implementations, the configuration of the aperture may be adjusted by placing a first aperture with the first aperture configuration in the beam path or removing the first aperture from the beam path and no aperture is placed in the beam path in place of the first aperture to produce the second aperture configuration. In some implementations, the configuration of the aperture is adjusted by adjusting a size of an opening in the aperture in the beam path to have the first aperture configuration or adjusting the size of the opening in the aperture in the beam path to have the second aperture configuration.

In some implementations, the aperture in the beam path is a detector side aperture positioned between the sample and detector. In some implementations, the aperture in the beam path is a light source side aperture positioned between the light source and the sample.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of determining a characteristic of a film on a sample with an optical metrology device, the method comprising:
   producing light with a light source;
   focusing the light to be obliquely incident in a measurement spot on the sample, wherein at least of portion of the light is reflected off the sample;
   receiving the light reflected from the sample with a detector;
   adjusting a configuration of an aperture in a beam path of the light to use a first aperture configuration or a second aperture configuration based on a thickness of the film on the sample, wherein the second aperture configuration allows more light to pass in the beam path than the first aperture configuration; and
   determining the characteristic of the film on the sample with output signals from the detector in response to the light reflected from the sample.

2. The method of claim 1, the measurement spot having a spot size, wherein adjusting the configuration of the aperture in the beam path of the light to use the first aperture configuration or the second aperture configuration comprises adjusting the aperture to the first aperture configuration if the thickness of the film causes a lateral shift from each internal reflection in the film that is less than 80% of the spot size, and adjusting the aperture to the second aperture configuration if the thickness of the film causes a lateral shift from each internal reflection in the film that is at least 80% of the spot size.

3. The method of claim 1, wherein adjusting the configuration of the aperture in the beam path of the light to use the first aperture configuration or the second aperture configuration comprises adjusting the aperture to the first aperture configuration if the thickness of the film is less than a predefined thickness, and adjusting the aperture to the second aperture configuration if the thickness of the film is at least the predefined thickness.

4. The method of claim 1, wherein adjusting the configuration of the aperture in the beam path of the light to use the first aperture configuration or the second aperture configuration comprises adjusting the aperture to the first aperture configuration if the thickness of the film produces inaccuracies in the characteristic of the film less than a predefined tolerance due to lateral beam shift of the light, and adjusting the aperture to the second aperture configuration if the thickness of the film produces inaccuracies in the characteristic of the film greater than the predefined tolerance due to the lateral beam shift of the light.

5. The method of claim 1, further comprising:
   receiving a first reflected light from the sample or another sample with the detector using the first aperture configuration;
   receiving a second reflected light from the sample or the other sample with the detector using the second aperture configuration; and
   comparing the first reflected light and the second reflected light;
   wherein adjusting the configuration of the aperture in the beam path of the light to use the first aperture configuration or the second aperture configuration comprises adjusting the aperture to the first aperture configuration if a difference between the first reflected light and the second reflected light is not greater than a predetermined threshold, and adjusting the aperture to the second aperture configuration if the difference between the first reflected light and the second reflected light is greater than the predetermined threshold.

6. The method of claim 1, wherein adjusting the configuration of the aperture comprises placing a first aperture with the first aperture configuration in the beam path or placing a second aperture with the second aperture configuration in the beam path, wherein the second aperture has an opening that is larger than an opening in the first aperture.

7. The method of claim 1, wherein adjusting the configuration of the aperture comprises placing a first aperture with the first aperture configuration in the beam path or removing the first aperture from the beam path and no aperture is placed in the beam path in place of the first aperture to produce the second aperture configuration.

8. The method of claim 1, wherein adjusting the configuration of the aperture comprises adjusting a size of an opening in the aperture in the beam path to have the first aperture configuration or adjusting the size of the opening in the aperture in the beam path to have the second aperture configuration.

9. The method of claim 1, wherein the aperture in the beam path is a detector side aperture positioned between the sample and the detector.

10. The method of claim 1, wherein the aperture in the beam path is a light source side aperture positioned between the light source and the sample.

11. The method of claim 1, further comprising communicating a signal to a process tool that causes the process tool to adjust a process parameter associated with a fabrication process step of a sample fabrication sequence based on the characteristic of the film.

12. The method of claim 1, wherein the optical metrology device is an ellipsometer.

13. An optical metrology device capable of determining a characteristic of a film on a sample, the optical metrology device comprising:
 a light source that produces light;
 a first set of focusing optics that obliquely focuses the light into a measurement spot on the sample, wherein at least a portion of the light is reflected by the sample;
 a detector that receives the light reflected from the sample;
 an adjustable aperture in a beam path of the light, wherein the adjustable aperture is configured to have a first aperture configuration or a second aperture configuration based on a thickness of the film on the sample, wherein the second aperture configuration allows more light to pass in the beam path than the first aperture configuration; and
 at least one processor coupled to the detector and configured to determine the characteristic of the sample with output signals from the detector in response to the light reflected from the sample.

14. The optical metrology device of claim 13, the measurement spot having a spot size, wherein the adjustable aperture is adjusted to the first aperture configuration if the thickness of the film causes a lateral shift from each internal reflection in the film that is less than 80% of the spot size, and the adjustable aperture is adjusted to the second aperture configuration if the thickness of the film causes a lateral shift from each internal reflection in the film that is at least 80% of the spot size.

15. The optical metrology device of claim 13, wherein the adjustable aperture is adjusted to the first aperture configuration if the thickness of the film is less than a predefined thickness, and the adjustable aperture is adjusted to the second aperture configuration if the thickness of the film is at least the predefined thickness.

16. The optical metrology device of claim 13, wherein the adjustable aperture is adjusted to the first aperture configuration if the thickness of the film produces inaccuracies in the characteristic of the film less than a predefined tolerance due to lateral beam shift of the light, and the adjustable aperture is adjusted to the second aperture configuration if the thickness of the film produces inaccuracies in the characteristic of the film greater than the predefined tolerance due to the lateral beam shift of the light.

17. The optical metrology device of claim 13, wherein the at least one processor is further configured to determine a difference between a first reflected light received from the sample by the detector with the adjustable aperture in the first aperture configuration and a second reflected light received from the sample or the other sample by the detector with the adjustable aperture in the second aperture configuration;
 wherein the adjustable aperture is adjusted to the first aperture configuration if the difference between the first reflected light and the second reflected light is not greater than a predetermined threshold, and the adjustable aperture is adjusted to the second aperture configuration if the difference between the first reflected light and the second reflected light is greater than the predetermined threshold.

18. The optical metrology device of claim 13, wherein the adjustable aperture comprises a first aperture with the first aperture configuration that is placed in the beam path or a second aperture with the second aperture configuration that is placed in the beam path, wherein the second aperture has an opening that is larger than an opening in the first aperture.

19. The optical metrology device of claim 13, wherein the adjustable aperture comprises a movable aperture with the first aperture configuration that is placed in the beam path or removed from the beam path and no aperture is placed in the beam path in place of the movable aperture to produce the second aperture configuration.

20. The optical metrology device of claim 13, wherein the adjustable aperture comprises a variable sized opening in the adjustable aperture that is in the beam path and a size of the variable sized opening is adjusted to have the first aperture configuration or adjusted to have the second aperture configuration.

21. The optical metrology device of claim 13, wherein the adjustable aperture in the beam path is a detector side aperture positioned between the sample and the detector.

22. The optical metrology device of claim 13, wherein the adjustable aperture in the beam path is a light source side aperture positioned between the light source and the sample.

23. The optical metrology device of claim 13, wherein the at least one processor is further configured to communicate a signal to a process tool that causes the process tool to adjust a process parameter associated with a fabrication process step of a sample fabrication sequence based on the characteristic of the film.

24. The optical metrology device of claim 13, wherein the optical metrology device is an ellipsometer.

25. An optical metrology device capable of determining a characteristic of a film on a sample, the optical metrology device comprising:
- a light source that produces light;
- a first set of focusing optics that obliquely focuses the light into a measurement spot on the sample, wherein at least a portion of the light is reflected by the sample;
- a detector that receives the light from the sample;
- a means for adjusting a configuration of an aperture in a beam path of the light to use a first aperture configuration or a second aperture configuration based on a thickness of the film on the sample, wherein the second aperture configuration allows more light to pass in the beam path than the first aperture configuration; and
- at least one processor coupled to the detector and configured to determine the characteristic of the sample with output signals from the detector in response to the light reflected from the sample.

26. The optical metrology device of claim 25, the measurement spot having a spot size, wherein the first aperture configuration is selected if the thickness of the film causes a lateral shift from each internal reflection in the film that is less than 80% of the spot size or if the thickness of the film is less than a predefined thickness, and the second aperture configuration is selected if the thickness of the film causes a lateral shift from each internal reflection in the film that is at least 80% of the spot size or if the thickness of the film is at least the predefined thickness.

27. The optical metrology device of claim 25, wherein the first aperture configuration is selected if the thickness of the film produces inaccuracies in the characteristic of the film less than a predefined tolerance due to lateral beam shift of the light, and wherein the second configuration is selected if the thickness of the film produces inaccuracies in the characteristic of the film greater than the predefined tolerance due to the lateral beam shift of the light.

28. The optical metrology device of claim 25, wherein the at least one processor is further configured to determine a difference between a first reflected light received from the sample by the detector with the first aperture configuration and a second reflected light received from the sample or the other sample by the detector with the second aperture configuration;
wherein the first configuration is selected if the difference between the first reflected light and the second reflected light is not greater than a predetermined threshold, and the second aperture configuration is selected if the difference between the first reflected light and the second reflected light is greater than the predetermined threshold.

29. The optical metrology device of claim 25, wherein the means for adjusting the configuration of the aperture places different sized openings in the beam path.

30. The optical metrology device of claim 25, wherein the means for adjusting the configuration of the aperture removes the aperture from the beam path to produce the second configuration.

31. The optical metrology device of claim 25, wherein the means for adjusting the configuration of the aperture varies an opening in the aperture.

32. The optical metrology device of claim 25, wherein the at least one processor is further configured to communicate a signal to a process tool that causes the process tool to adjust a process parameter associated with a fabrication process step of a sample fabrication sequence based on the characteristic of the film.

33. The optical metrology device of claim 25, wherein the optical metrology device is an ellipsometer.

\* \* \* \* \*